(12) United States Patent
Ishida

(10) Patent No.: US 11,743,403 B2
(45) Date of Patent: Aug. 29, 2023

(54) IMAGE READING DEVICE AND IMAGE FORMING APPARATUS CONFIGURED TO DETERMINE MEASUREMENTS OF AN OBJECT-TO-BE SCANNED

(71) Applicant: Masahiro Ishida, Kanagawa (JP)

(72) Inventor: Masahiro Ishida, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 17/498,864

(22) Filed: Oct. 12, 2021

(65) Prior Publication Data
US 2022/0124214 A1  Apr. 21, 2022

(30) Foreign Application Priority Data

Oct. 21, 2020 (JP) .................................. 2020-176587
Sep. 6, 2021 (JP) .................................. 2021-144483

(51) Int. Cl.
| | |
|---|---|
| *H04N 1/00* | (2006.01) |
| *G01B 11/02* | (2006.01) |
| *G06T 7/50* | (2017.01) |
| *G01B 11/24* | (2006.01) |

(52) U.S. Cl.
CPC ....... *H04N 1/00827* (2013.01); *G01B 11/022* (2013.01); *G06T 7/50* (2017.01); *H04N 1/00801* (2013.01)

(58) Field of Classification Search
CPC .. H04N 1/00827; H04N 1/00801; G06T 7/50; G01B 11/022; G01B 21/20; G01B 11/24; G01B 5/20; G01B 5/0002; G01S 17/89

USPC ......................................................... 358/474
See application file for complete search history.

(56) References Cited

U.S. PATENT DOCUMENTS

| | | | |
|---|---|---|---|
| 5,475,422 A * | 12/1995 | Mori ..................... | G06T 11/006 348/E13.008 |
| 10,291,805 B1 * | 5/2019 | Moro .................... | G06V 30/413 |
| 2007/0076268 A1 * | 4/2007 | Shojo ................. | H04N 1/19594 358/401 |
| 2009/0219580 A1 * | 9/2009 | Cornell ................ | H04N 1/0035 358/425 |

(Continued)

FOREIGN PATENT DOCUMENTS

| | | | |
|---|---|---|---|
| CN | 101660894 B | * | 5/2011 |
| JP | 2004212301 A | * | 7/2004 |

(Continued)

*Primary Examiner* — Chad Dickerson
(74) *Attorney, Agent, or Firm* — Harness, Dickey & Pierce, P.L.C.

(57) ABSTRACT

An image reading device and an image forming apparatus. The image reading device includes a scanned-image acquisition unit configured to scan a mounting table to obtain image data of a to-be-scanned object placed on the mounting table, a capturing unit configured to capture an image of the to-be-scanned object to obtain image data of the to-be-scanned object, and a shape measuring device configured to perform a shape measurement process to measure a shape of the to-be-scanned object placed on the mounting table based on the image data of the to-be-scanned object obtained by the scanned-image acquisition unit and the image data of the to-be-scanned object obtained by the capturing unit. The image forming apparatus includes the image reading device and an image recording unit configured to record an image on a recording material.

20 Claims, 13 Drawing Sheets

(56) References Cited

U.S. PATENT DOCUMENTS

| | | | |
|---|---|---|---|
| 2011/0002529 A1* | 1/2011 | Jeong | G01B 11/25 |
| | | | 382/147 |
| 2018/0007233 A1* | 1/2018 | Aramaki | G06V 30/413 |
| 2019/0361381 A1 | 11/2019 | Ishida | |
| 2019/0361385 A1 | 11/2019 | Ishida et al. | |
| 2019/0361387 A1 | 11/2019 | Ishida | |
| 2020/0073320 A1 | 3/2020 | Ishida | |
| 2020/0171866 A1 | 6/2020 | Ishida et al. | |

FOREIGN PATENT DOCUMENTS

| | | | |
|---|---|---|---|
| JP | 2007-104339 | | 4/2007 |
| JP | 2017136709 A | * | 8/2017 |
| JP | 2017-175594 | | 9/2017 |
| JP | 2017175594 A | * | 9/2017 |

* cited by examiner

IMAGE READING DEVICE AND IMAGE FORMING APPARATUS CONFIGURED TO DETERMINE MEASUREMENTS OF AN OBJECT-TO-BE SCANNED

CROSS-REFERENCE TO RELATED APPLICATIONS

This patent application is based on and claims priority pursuant to 35 U.S.C. § 119(a) to Japanese Patent Application Nos. 2020-176587 and 2021-144483, filed on Oct. 21, 2020, and Sep. 6, 2021, respectively, in the Japan Patent Office, the entire disclosures of which are hereby incorporated by reference herein.

BACKGROUND

Technical Field

Embodiments of the present disclosure relate to an image reading device and an image forming apparatus.

Background Art

In the related art, image reading devices including a scanned-image acquisition unit configured to scan a mounting surface of a mounting table to obtain image data of a to-be-scanned object placed on the mounting table, and an capturing unit configured to capture the to-be-scanned object to obtain the image data of the to-be-scanned object are known in the art.

For example, image reading devices including a scanner unit such as a scanned-image acquisition unit configured to scan a face-down document on a contact glass such as a mounting table from below, and a rotatable pressure plate configured to hold the face-down document on the contact glass are known in the art. As known in the art, such image reading devices may further include an capturing unit configured to capture an image of a face-up document placed on a top face of the closed pressure plate from above.

SUMMARY

Embodiments of the present disclosure described herein provide an image reading device and an image forming apparatus. The image reading device includes a scanned-image acquisition unit configured to scan a mounting table to obtain image data of a to-be-scanned object placed on the mounting table, a capturing unit configured to capture an image of the to-be-scanned object to obtain image data of the to-be-scanned object, and a shape measuring device configured to perform a shape measurement process to measure a shape of the to-be-scanned object placed on the mounting table based on the image data of the to-be-scanned object obtained by the scanned-image acquisition unit and the image data of the to-be-scanned object obtained by the capturing unit. The image forming apparatus includes the image reading device and an image recording unit configured to record an image on a recording material.

BRIEF DESCRIPTION OF THE DRAWINGS

A more complete appreciation of embodiments and the many attendant advantages thereof will be readily obtained as the same becomes better understood by reference to the following detailed description when considered in connection with the accompanying drawings.

Figure 1:
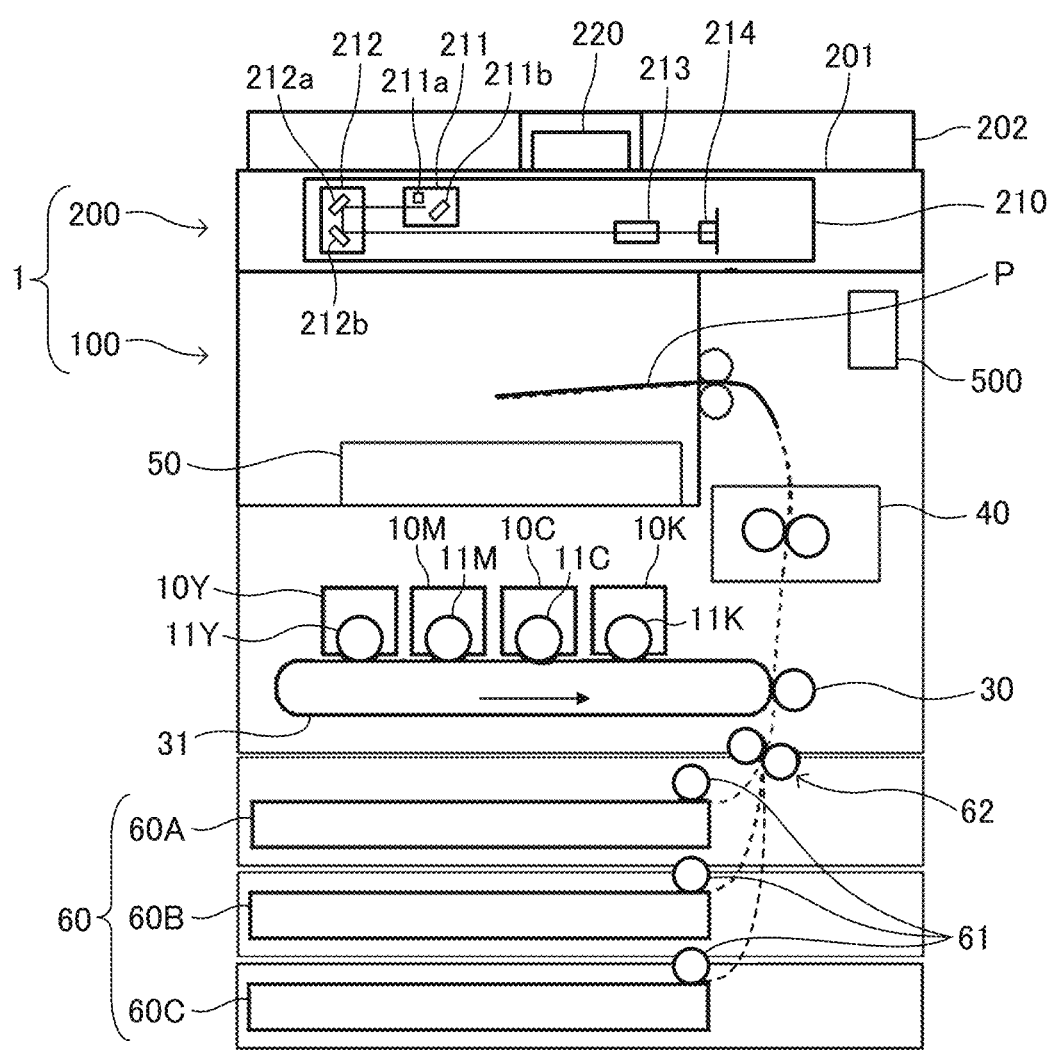
FIG. 1 is a schematic diagram illustrating a configuration of an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments illustrated in the drawings, specific terminology is employed for the sake of clarity. However, the present disclosure is not intended to be limited to the specific terminology so selected and it is to be understood that each specific element includes all technical equivalents that have the same structure, operate in a similar manner, and achieve a similar result.

First Embodiment

An image reading device according to an embodiment of the present disclosure, which serves as an image scanner and is provided for an image forming apparatus provided with an electrophotographic image recording unit, is described below.

The image forming apparatus according to the first embodiment of the present disclosure is provided with an electrophotographic image forming device. However, no limitation is indicated thereby, and the image forming apparatus according to the present embodiment may be provided with an image forming device that adopts different image forming methods such as an inkjet printing system. The image forming apparatus according to the first embodiment of the present disclosure is a tandem color image forming apparatus that adopts an intermediate transfer system in which the image forming device is provided with four photoconductors. However, no limitation is indicated thereby, and the image forming apparatus according to the present embodiment may be a monochrome image forming apparatus or a color image forming apparatus a color image forming apparatus that adopts different methods or systems. In the following description, Y, M, C, and K denote members related to yellow, magenta, cyan, and black, respectively.

FIG. 1 is a schematic diagram illustrating a configuration of the image forming apparatus 1 according to the first embodiment of the present disclosure.

Figure 2:
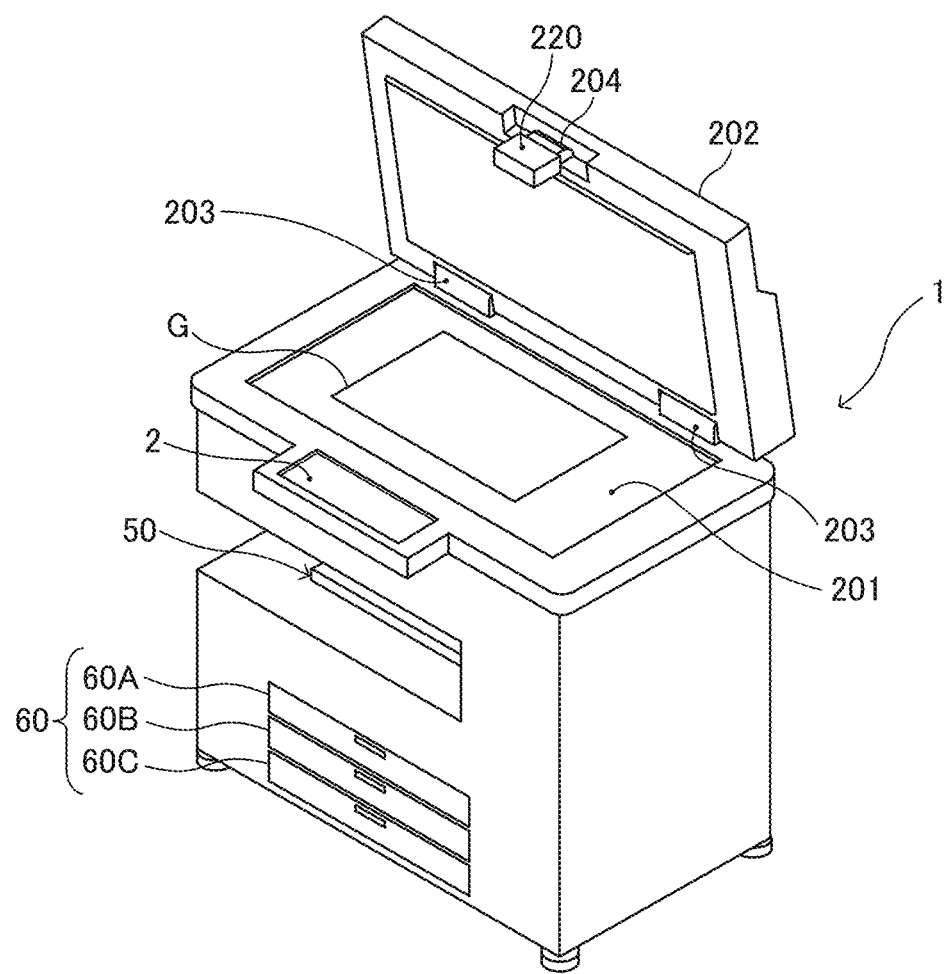
FIG. 2 is a perspective view of the image forming apparatus of FIG. 1 to illustrate its external appearance.

FIG. 2 is a perspective diagram illustrating the external appearance of the image forming apparatus 1 according to the first embodiment of the present disclosure.

The image forming apparatus 1 according to the first embodiment of the present disclosure includes an image forming device 100 that serves as an image recording unit, and an image reading device 200 that serves as an image reading unit. Moreover, the image forming apparatus 1 is provided with, for example, an operation panel 2 used to receive an instruction or selection.

The image forming device 100 according to the present embodiment records or forms an image on a sheet P that serves as a recording material. The image forming device 100 according to the present embodiment is a tandem image forming apparatus in which a plurality of image forming units 10Y, 10M, 10C, and 10K that correspond to yellow (Y), magenta (M), cyan (C), and black (K) colors, respectively, are arranged along the rotation direction of an intermediate transfer belt 31 that serves as an intermediate transferor. The image forming units 10Y, 10M, 10C, and 10K are provided with a plurality of photoconductors 11Y, 11M, 11C, and 11K that serve as latent-image bearers, respectively.

Each one of the multiple image forming units 10Y, 10M, 10C, and 10K is provided with a charging device that serves as a charger and evenly charges the surface of corresponding one of the photoconductors 11Y, 11M, 11C, and 11K at a predetermined level of electrical potential. Each one of the multiple image forming units 10Y, 10M, 10C, and 10K is provided with an optical writing device that serves as an electrostatic latent image forming unit and expose the surface of corresponding one of the photoconductors 11Y, 11M, 11C, and 11K and write an electrostatic latent image on the surface of the corresponding one of the photoconductors 11Y, 11M, 11C, and 11K whose surfaces have been evenly charged by the charging devices according to the image data. Each one of the multiple image forming units 10Y, 10M, 10C, and 10K is provided with a developing device that forms a toner image through the developing procedure in which toner of corresponding one of the yellow (Y), magenta (M), cyan (C), and black (K) colors is made adhered to the electrostatic latent image formed on the corresponding one of the photoconductors. Each one of the multiple image forming units 10Y, 10M, 10C, and 10K is provided with a primary transfer device that serves as a primary transfer unit and transfers the toner image formed on each one of the photoconductors 11Y, 11M, 11C, and 11K onto the intermediate transfer belt 31. Each one of the multiple image forming units 10Y, 10M, 10C, and 10K is provided with a cleaner that removes and cleans the transfer residual toner formed on each one of the photoconductors.

The multicolor toner images that are formed on of the respective photoconductors 11Y, 11M, 11C, and 11K are primarily transferred onto the intermediate transfer belt 31 by the primary transfer device so as to be superimposed on top of one another. As a result, a color toner image is formed on the intermediate transfer belt 31. As the intermediate transfer belt 31 rotates, the color toner image that is formed on the intermediate transfer belt 31 is conveyed to the facing space where the intermediate transfer belt 31 and the secondary transfer device 30 face each other. The above facing space may be referred to as a secondary transfer area in the following description.

Moreover, in the configuration according to the present embodiment, a sheet feeder 60 that serves as a feeder and feeds the stored sheet of paper P is provided in a lower portion of the image forming device 100. The sheet feeder 60 according to the first embodiment of the present disclosure includes three feed trays including an upper feed tray 60A, a middle feed tray 60B, and a lower feed tray 60C. The sheet feeder 60 according to the present embodiment causes a pickup roller 61 to feed the sheet of paper P on a one-by-one basis from one of the upper feed tray 60A, the middle feed tray 60B, and the lower feed tray 60C, which is selected based on the instructions sent from a controller 500 of the image forming device 100. Accordingly, the sheet of paper P is conveyed to the secondary transfer area through a conveyance roller pair 62 along the conveyance path indicated by the broken lines in FIG. 1.

The color toner image that is formed on the intermediate transfer belt 31 is transferred onto the sheet P, which is conveyed through the conveyance roller pair 62 at a prescribed timing, at the secondary transfer area by a secondary transfer device 30 in the secondary transfer process. The sheet of paper P on which a color toner image has been formed is then conveyed to a fixing device 40 that serves as a fixing unit, and heat and pressure are applied to the sheet of paper P to fix the color toner image on the sheet of paper P. The sheet of paper P on which the color toner has been fixed is conveyed along the conveyance path indicated by the broken lines in FIG. 1, and is ejected to an output tray 50 that serves as a sheet ejection unit.

The image reading device 200 reads the image data of a document G that is a to-be-scanned object placed on the top surface of a contact glass 201, and is disposed above the image forming device 100. The contact glass 201 serves as a mounting table. The image reading device 200 according to the first embodiment of the present disclosure is provided with a scanner unit 210 that serves as a scanned-image acquisition unit and scans the top surface of the contact glass 201 to acquire the image data of the document G placed on the contact glass 201 from below. Moreover, the image reading device 200 according to the first embodiment of the present disclosure is provided with a capturing unit 220 that serves as an imaging device and captures an image of the document G that is a to-be-scanned object placed on the top surface of the contact glass 201 from above to acquire the image data of the document G from above.

The image reading device 200 is provided with a pressure plate 202 that serves as a pressing member. The pressure plate 202 is openable and closable with respect to the contact glass 201, and presses the document G placed on the contact glass 201 against the top surface of the contact glass 201. The pressure plate 202 is supported in an openable and closable manner by a pressure plate hinge 203 disposed on rear back side of the image reading device 200. The image reading device 200 is also provided with a capturing unit 220 on the front side of the pressure plate 202 having a unit hinge 204 therebetween.

When the image data of the document G from below is acquired using only the scanner unit 210 and not using the capturing unit 220, the document G is set on the contact glass 201, and the pressure plate 202 is closed. Then, the acquisition operation is performed. On the other hand, when the image data of the document G is acquired from above using both the capturing unit 220 and the scanner unit 210, the document G is set on the contact glass 201, and acquisition operation or imaging operation is performed while the pressure plate 202 is kept opened.

When the image data of the document G is acquired using only the scanner unit 210, a first carrier 211 and a second carrier 212 start moving together, and a light source 211a that is provided for the first carrier 211 emits light. Then, the light that is reflected by the backside of the document G is reflected by a mirror 211b of the first carrier 211, and is reflected by a pair of mirrors 212a and 212b arranged within the second carrier 212. Then, the reflected light passes through the imaging lens 213, and is incident on a sensor 214. The sensor 214 builds or forms the image data of the backside of the document G based on the incident light, and sends the image data to the controller 500.

The capturing unit 220 according to the present embodiment includes an image sensor such as a charge coupled device (CCD) or a complementary metal oxide semiconductor (CMOS), and receives the light from a capturing range with the image sensor to generate image data. Then, the capturing unit 220 sends the image data to the controller 500. The capturing unit 220 according to the first embodiment is provided on the pressure plate 202. As the opened angle of the pressure plate 202 is changed, the relative positions of the capturing unit 220 and the contact glass 201 can be changed. In particular, the distance between the contact glass 201 and the capturing unit 220 can be changed. As the pressure plate 202 is opened at a predetermined angle, the capturing unit 220 takes a predetermined position with respect to the contact glass 201, and can capture an image of the entire area of the contact glass 201.

Figure 3:
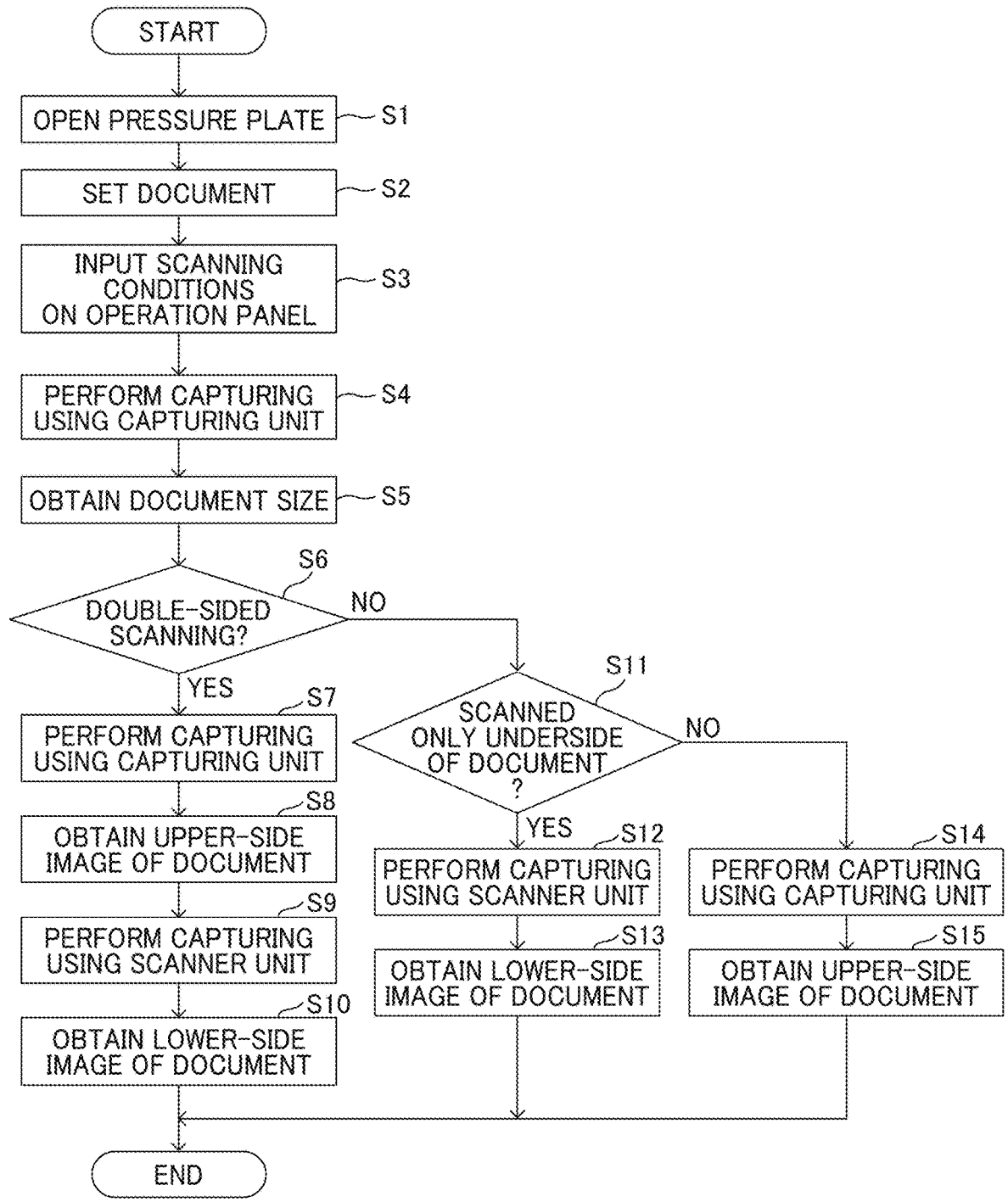
FIG. 3 is a flowchart of the processes of reading the image data of a document set on a contact glass, using an image reading device of the image forming apparatus of FIG. 1.

FIG. 3 is a flowchart of the processes of reading the image data of the document G set on the contact glass 201, using the image reading device 200, according to the first embodiment of the present disclosure.

When the image data of the document G placed on the contact glass 201 is read by the image reading device 200, in a step S1, firstly, as illustrated in FIG. 2, the pressure plate 202 is opened up to a prescribed angle, and in a step S2, the document G is set on the contact glass 201. Then, in a step S3, the operation panel 2 is operated or manipulated to input, for example, scanning conditions to start the scanning.

The controller 500 controls the image reading device 200 based on the instructions and data input through the operation panel 2, and in a step S4, firstly, uses the capturing unit 220 that is mounted on the pressure plate 202 and is opened at a predetermined angle, to capture the document G on the contact glass 201 from above. Due to such a configuration, the top-shot image data of the entire area of the contact glass 201 including the document G, which is captured from above, is acquired, and the acquired image data is sent to the controller 500. In a step S5, the controller 500 obtains the size of the document G on the contact glass 201 based on the top-shot image data of the entire area.

Subsequently, in a step S6, the controller 500 determines whether or not double-sided scanning is to be performed to read the image data on both sides of the document G, based on the input data such as the scanning conditions input in the step S3. When it is determined that double-sided scanning is to be performed ("YES" in the step S6), in a step S7, the controller 500 uses an autofocus function of the capturing unit 220 to adjust the capturing range to a size suited to the document G based on the document size acquired in the step S5, and captures an image of the document G from above. As a result, in a step S8, the top-shot image data of the document G from above is acquired, and the acquired image data is sent to the controller 500.

In a step S9, the controller 500 determines the scanning range based on the document size acquired in the step S5 and causes the first carrier 211 and the second carrier 212 to move according to the determined scanning range, and causes the scanner unit 210 to scan the document G from below. Accordingly, in a step S10, the image data of the document G from below is acquired, and the acquired image data is sent to the controller 500.

On the other hand, when it is determined that only the downside of the document G has been scanned ("NO" in the step S6, "YES" in the step S11), in a step S12, the controller 500 determines the scanning range based on the document size acquired in the step S5 and causes the first carrier 211 and the second carrier 212 to move according to the determined scanning range, and captures an image of the document G from below. Accordingly, in a step S13, the image data of the document G from below is acquired, and the acquired image data is sent to the controller 500.

On the other hand, when it is determined that is determined that only the top surface of the document G is scanned ("NO" in the step S6, "NO" in the step S11), in the step S14, the controller 500 adjusts the capturing range to a size suited to the document G based on the document size acquired in the step S5, and captures an image of the document G from above. As a result, in a step S15, the top-shot image data of the document G from above is acquired, and the acquired image data is sent to the controller 500.

The image data that is obtained as described above is used to form an image on the sheet P by the image forming device 100 based on, for example, an instruction to perform photocopying. For example, the image data that is obtained as described above may be stored in a storage device inside the apparatus based on an instruction to perform scanning, or may be sent to a storage device of an external device outside the apparatus via an output interface and then be stored. For example, the image data that is obtained as described above may be used to measure the shape of a three-dimensional to-be-scanned object based on an instruction to measure the shape.

First shape measurement processes are described below in which the shape of a three-dimensional object is measured based on the image data acquired by the image reading device 200.

Figure 4A:
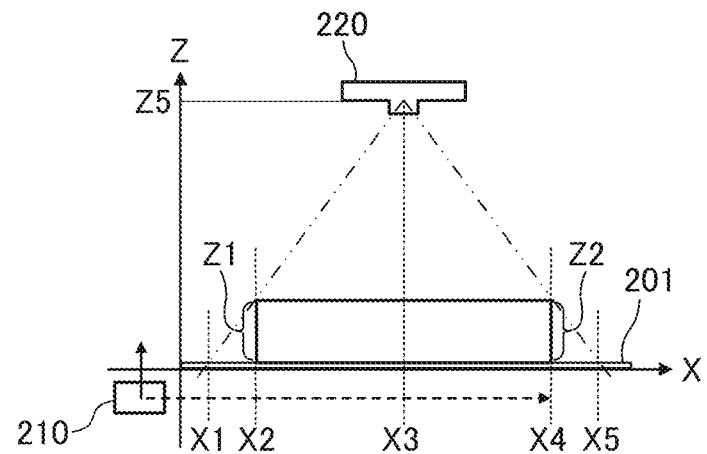
FIG. 4A is a diagram illustrating how the dimension of a three-dimensional object in an X-direction, i.e., the right and left directions of the image forming apparatus 1 as illustrated in FIG. 1, is measured in the first shape measurement processes, according to an embodiment of the present disclosure.

FIG. 4A is a diagram illustrating how the dimension of a three-dimensional object in an X-direction, i.e., the right and left directions of the image forming apparatus 1 as illustrated in FIG. 1, is measured, according to the present embodiment.

Figure 4B:
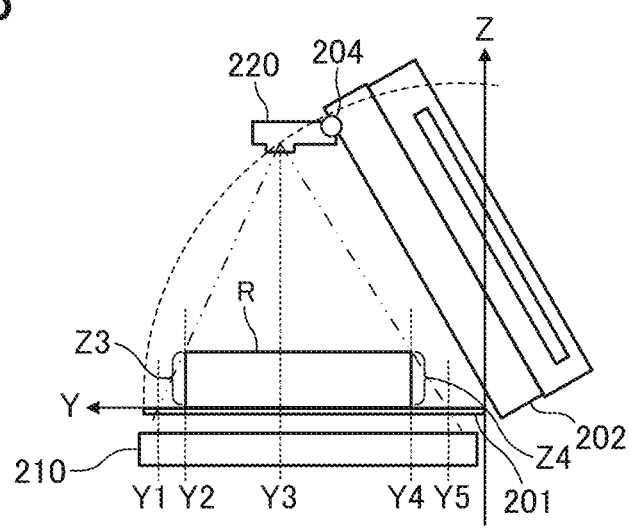
FIG. 4B is a diagram illustrating how the dimension of a three-dimensional object in a Y-direction, i.e., the forward and backward directions of the image forming apparatus 1 as illustrated in FIG. 1, is measured in the first shape measurement processes, according to an embodiment of the present disclosure.

FIG. 4B is a diagram illustrating how the dimension of a three-dimensional object in a Y-direction, i.e., the forward and backward directions of the image forming apparatus 1 as illustrated in FIG. 1, is measured, according to the present embodiment.

Figure 4C:
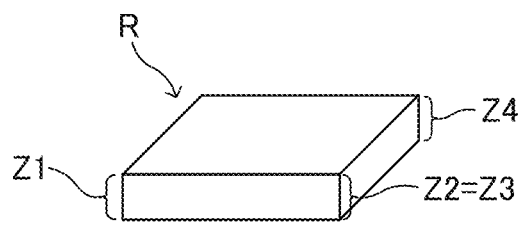
FIG. 4C is a schematic diagram illustrating an object to be measured according to the present embodiment.

FIG. 4C is a schematic diagram illustrating an object to be measured according to the present embodiment.

In the following description, the up-and-down directions of the image forming apparatus 1 are referred to as the Z-direction. In FIG. 4A, FIG. 4B, and FIG. 4C, X3 denotes the position of the optical axis of the lens of the capturing unit 220 in the X-direction, and Y3 denotes the position of the optical axis of the lens of the capturing unit 220 in the Y-direction. Note that the position of the optical axis of the lens of the capturing unit 220 in the Y-direction changes depending on the angle of the pressure plate 202. In FIG. 4A, FIG. 4B, and FIG. 4C, Z5 denotes the distance from the bottom face of the lens of the capturing unit 220 to the top face of the contact glass 201.

The three-dimensional object R to be measured has a shape of rectangular parallelepiped as illustrated in FIG. 4C. However, no limitation is indicated thereby. For example, as illustrated in FIG. 5A, FIG. 5B, and FIG. 5C, the three-dimensional object R to be measured may have a cylindrical shape.

Figure 5A:
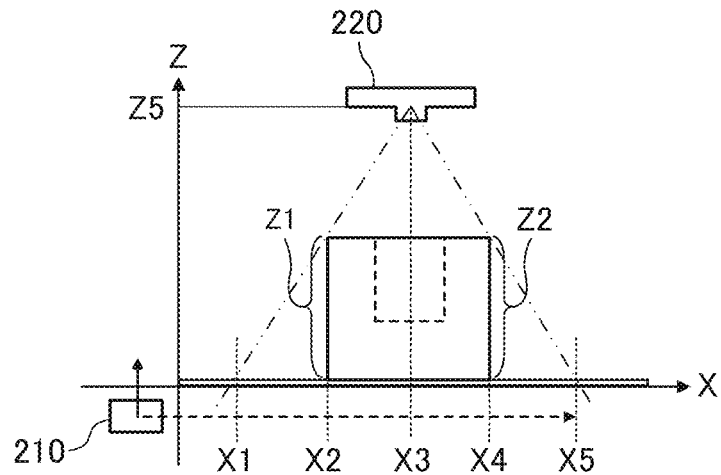
FIG. 5A is a diagram illustrating how the dimension of a three-dimensional object in an X-direction, i.e., the right and left directions of the image forming apparatus 1 as illustrated in FIG. 1, is measured in the first shape measurement processes, according to an alternative embodiment of the present disclosure.

FIG. 5A is a diagram illustrating how the dimension of a three-dimensional object in an X-direction, i.e., the right and left directions of the image forming apparatus 1 as illustrated in FIG. 1, is measured in the first shape measurement processes, according to an alternative embodiment of the present disclosure.

Figure 5B:
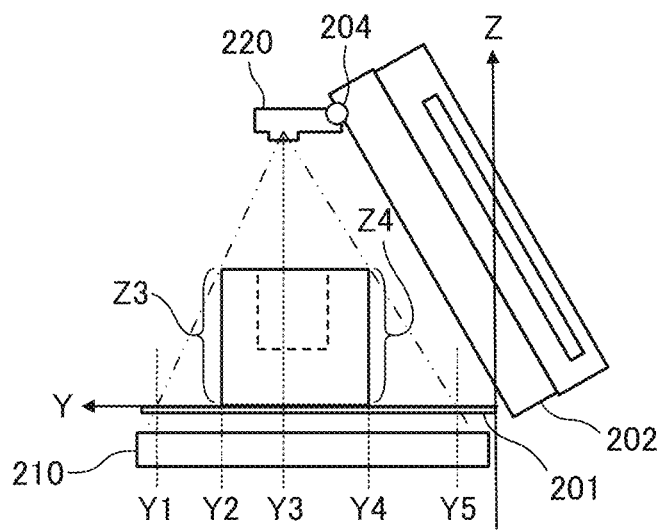
FIG. 5B is a diagram illustrating how the dimension of a three-dimensional object in a Y-direction, i.e., the forward and backward directions of the image forming apparatus 1 as illustrated in FIG. 1, is measured in the first shape measurement processes, according to an alternative embodiment of the present disclosure.

FIG. 5B is a diagram illustrating how the dimension of a three-dimensional object in a Y-direction, i.e., the forward and backward directions of the image forming apparatus 1 as illustrated in FIG. 1, is measured in the first shape measurement processes, according to an alternative embodiment of the present disclosure.

Figure 5C:
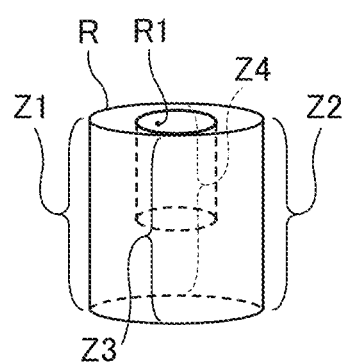
FIG. 5C is a schematic diagram of an object to be measured according to an alternative embodiment of the present disclosure.

FIG. 5C is a schematic diagram of an object to be measured according to an alternative embodiment of the present disclosure.

In the first shape measurement processes, the heights $Z1$, $Z2$, $Z3$, and $Z4$ of the three-dimensional object R as illustrated in FIG. 4C and FIG. 5C are measured. When the height $Z1$ of the three-dimensional object R is to be measured, the first equation given below may be used to obtain the height.

$$Z1 = X2 - X1/X3 - X1 \cdot Z5 \qquad \text{First Equation}$$

X3 denotes the position of the optical axis of the lens of the capturing unit 220 in the X-direction when the pressure plate 202 is opened up to a prescribed angle and the relative position of the capturing unit 220 is adjusted at a predetermined position. X2 denotes the position of the left end of the three-dimensional object R in the X-direction. X1 denotes the position of a point at which a line passing through the top-left end of the three-dimensional object R and a point through which the optical axis of the lens passes on the bottom face of the lens of the capturing unit 220 when the pressure plate 202 is opened up to a prescribed angle and the relative position of the capturing unit 220 is adjusted at a predetermined position intersects with the contact glass 201 on the X-Z plane, in the X-direction.

In a similar manner to the above, when the height $Z2$ of the three-dimensional object R is to be measured, the second equation given below may be used to obtain the height.

$$Z2 = X5 - X4/X5 - X3 \cdot Z5 \qquad \text{Second Equation}$$

X4 denotes the position of the right end of the three-dimensional object R in the X-direction. X5 denotes the position of a point at which a line passing through the top-right end of the three-dimensional object R and a point through which the optical axis of the lens passes on the bottom face of the lens of the capturing unit 220 when the pressure plate 202 is opened up to a prescribed angle and the relative position of the capturing unit 220 is adjusted at a predetermined position intersects with the contact glass 201 on the X-Z plane, in the X-direction.

When the height Z3 (=Z2) of the three-dimensional object R is to be measured, the third equation given below may be used to obtain the height.

$$Z3 = Y1 - Y2/X1 - Y3 Z5 \qquad \text{Third Equation}$$

Y3 denotes the position of the optical axis of the lens of the capturing unit 220 in the Y-direction when the pressure plate 202 is opened up to a prescribed angle and the relative position of the capturing unit 220 is adjusted at a predetermined position. Y2 denotes the position of the front end of the three-dimensional object R in the Y-direction. Y1 denotes the position of a point at which a line passing through the front end of the three-dimensional object R and a point through which the optical axis of the lens passes on the bottom face of the lens of the capturing unit 220 when the pressure plate 202 is opened up to a prescribed angle and the relative position of the capturing unit 220 is adjusted at a predetermined position intersects with the contact glass 201 on the Y-Z plane, in the Y-direction.

When the height Z4 of the three-dimensional object R is to be measured, the fourth equation given below may be used to obtain the height.

$$Z4 = Y4 - Y5/Y3 - Y5 Z5 \qquad \text{Fourth Equation}$$

Y4 denotes the position of the rear end of the three-dimensional object R in the Y-direction. Y5 denotes the position of a point at which a line passing through the rear end of the three-dimensional object R and a point through which the optical axis of the lens passes on the bottom face of the lens of the capturing unit 220 when the pressure plate 202 is opened up to a prescribed angle and the relative position of the capturing unit 220 is adjusted at a predetermined position intersects with the contact glass 201 on the Y-Z plane, in the Y-direction.

It is difficult to measure the heights Z1, Z2, Z3, and Z4 of the three-dimensional object R with high accuracy if the measurement is based only on the image data acquired by the scanner unit 210 or if the measurement is based only on the image data acquired by the capturing unit 220. In the first shape measurement processes, the heights Z1, Z2, Z3, and Z4 of the three-dimensional object R can be measured with high accuracy based on the image data acquired by both the scanner unit 210 and the capturing unit 220.

More specifically, in order to obtain the height Z1 of the three-dimensional object R based on the above first equation, Z5, X1, X2, and X3 need to be acquired. Although Z5 and X3 are numerical values that are determined in advance, X1 and X2 need to be measured. As X2 denotes the position of the left end of the three-dimensional object R in the X-direction, measurement can be done with a high degree of accuracy based on the image data that is acquired by the scanner unit 210. X2 can also be measured from the image data acquired by the capturing unit 220. However, the scanner unit 210 scans the surface of the contact glass 201 to read image data, and the dimensional accuracy and positional accuracy in the directions of the plane of the contact glass 201 are very high. In view of the above circumstances, in the first shape measurement processes, X2 is measured based on the image data that is acquired by the scanner unit 210.

On the other hand, X1 can be measured from the image data acquired by the capturing unit 220. More specifically, for example, the capturing unit 220 receives the direct light emitted from a light source 211*a* disposed on the first carrier 211 of the scanner unit 210. In view of the above, X1 can be calculated based on the position in the X-direction of the boundary at which the presence or absence of the reception of the direct light from the light source 211*a* changes on the image acquired by the capturing unit 220.

The other heights Z2, Z3, and Z4 of the three-dimensional object R can also be measured in the same manner as the height Z1.

The flow of the first shape measurement processes to measure the heights Z1, Z2, Z3, and Z4 of the above three-dimensional object R is described below. Firstly, the pressure plate 202 is opened up to a prescribed angle, and the three-dimensional object R that is an to-be-scanned object is set on the contact glass 201. Then, the operation panel 2 is operated or manipulated to input, for example, shape measurement conditions such as the points whose heights are to be measured, to start the shape measurement. Accordingly, the controller 500 according to the present embodiment acquires the image data of the three-dimensional object R on the contact glass 201 using both the scanner unit 210 and the capturing unit 220.

When the point whose height is to be measured is to be specified, the operation panel 2 may be operated to specify the position, but any other methods may be used. For example, a sheet such as a design drawing and a blueprint having an image indicating the point thereon is set on the contact glass 201 in advance, and the image data may be obtained by the scanner unit 210 or the capturing unit 220 to specify the prescribed point based on the obtained image data. In such cases, the manipulation to specify a point whose height is to be measured can be omitted.

The capturing unit 220 may perform an imaging operation while the scanner unit 210 is performing an acquisition operation. In other words, an image of the entire area of the contact glass 201 is captured by the capturing unit 220 while the carrier 211 and the carrier 212 of the scanner unit 210 are scanning the three-dimensional object R on the contact glass 201 to obtain the image data. Accordingly, the capturing unit 220 can acquire an image of the entire area of the contact glass 201, and such an acquired image includes direct light of the light that is emitted from the light source 211*a* on the first carrier 211 while the scanner unit 210 is performing an acquisition operation.

As described above, the controller 500 that has acquired the image data obtained by the scanner unit 210 and the image data obtained by the capturing unit 220 calculates a plurality of parameters X1 to X5 and Y1 to Y5 used to calculate the heights Z1, Z2, Z3, and Z4 of the three-dimensional object R, based on those items of image data. Then, the controller 500 calculates the heights Z1, Z2, Z3, and Z4 of the three-dimensional object R on the contact glass 201 based on the above first to third equations. Subsequently, the controller 500 controls, for example, the image forming device 100 to output the result of the shape measurement processes to the sheet P, or to store the result of the shape measurement processes in a storage device inside the image forming apparatus 1. Alternatively, the controller 500 controls, for example, the image forming device 100 to send the result of the shape measurement processes to an external device through an output interface.

The result of the first shape measurement processes includes, for example, the calculation results of the heights Z1, Z2, Z3, and Z4 of the three-dimensional object R and the image of the three-dimensional object R formed based on the image data obtained by the capturing unit 220. In particular, as the image of the three-dimensional object R formed based on the image data obtained by the capturing unit 220 is included, the internal shape of the upper opening hole R1 of a cylindrical three-dimensional object R as illustrated in FIG. 5C can be figured out. As a result, whether the internal shape of the upper opening hole R1 of the three-dimensional object R has a dimensional shape as illustrated in FIG. 6A or a dimensional shape as illustrated in FIG. 6B can be distinguished and figured out.

Figure 6A:
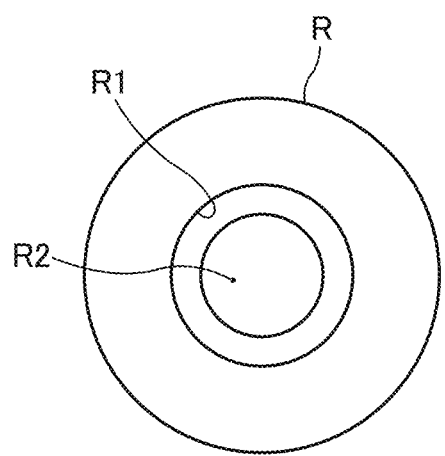
FIG. 6A and FIG. 6B are plan views of the three-dimensional object of FIG. 5C as viewed from above.
Figure 6B:
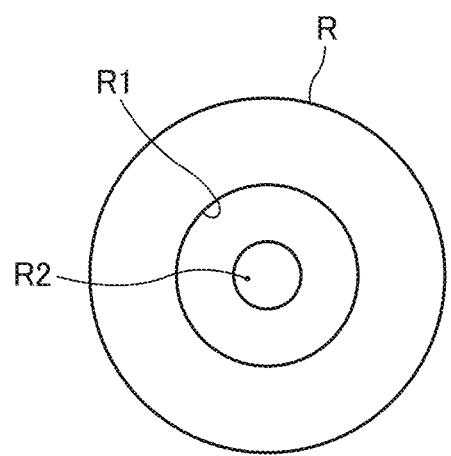

FIG. 6A and FIG. 6B are plan views of the three-dimensional object of FIG. 5C as viewed from above.

In the first shape measurement processes, the pressure plate 202 needs to be kept opened at a predetermined angle in order to determine the relative position the capturing unit 220 at the predetermined position. As the pressure plate hinge 203 according to the first embodiment of the present disclosure has a mechanism to keep the pressure plate 202 opened at a predetermined angle on a temporary basis, the pressure plate 202 can easily be opened at a predetermined angle.

The predetermined position of the capturing unit 220 is not necessarily determined in advance, but may be any position. For example, the pressure plate hinge 203 according to the first embodiment of the present disclosure may be provided with a mechanism to keep the pressure plate 202 opened at any desired angle on a temporary basis, and may be provided with a detector such as an encoder used to detect the opened angle of the pressure plate 202. According to such a configuration, even if the pressure plate 202 is opened at a desired angle, the opened angle of the pressure plate 202 can be figured out based on output from the detector. If the opened angle of the pressure plate 202 is figured out, the relative positions of the contact glass 201 and the capturing unit 220 attached to the pressure plate 202 can be specified. In particular, the distance between the contact glass 201 and the capturing unit 220 can be specified. Accordingly, the above values of Z5, X3, and Y3 can be specified.

However, as described above, when the predetermined position of the capturing unit 220 can be changed to any desired position, the image-capturing direction of the capturing unit 220 also changes depending on the opened angle of the pressure plate 202. In order to deal with such a situation, it is desired that the capturing unit 220 be attached to the pressure plate 202 having the unit hinge 204 therebetween, and it is desired that the image-capturing direction of the capturing unit 220 be adjusted such that the capturing unit 220 performs capturing in the vertical direction even if the opened angle of the pressure plate 202 is changed.

Second shape measurement processes are described below in which the shape of a three-dimensional object is measured based on the image data acquired by the image reading device 200. Overlapping descriptions with the description of the above embodiments as described above are omitted where appropriate.

Figure 7A:
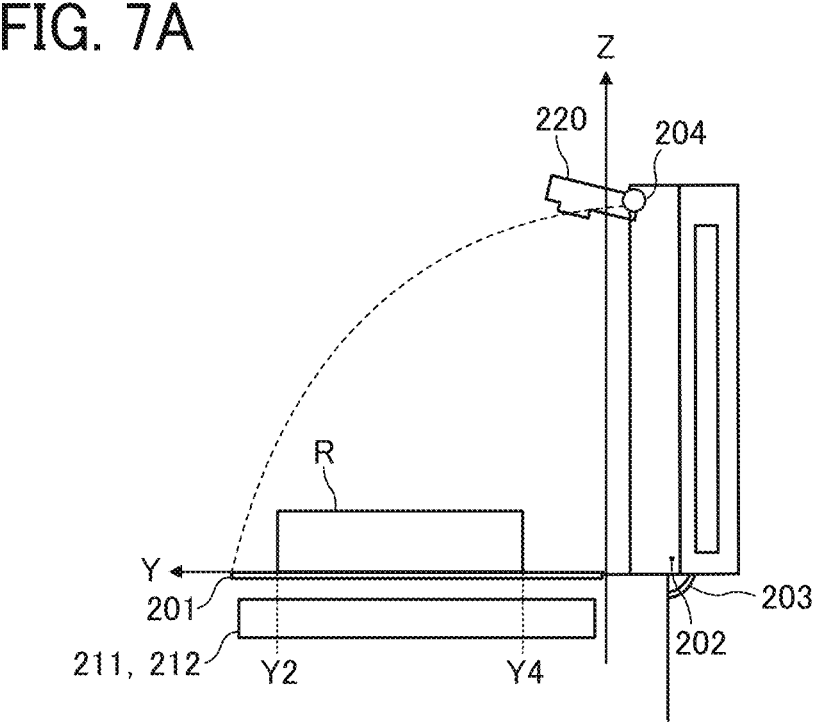
FIG. 7A is a schematic diagram illustrating a state in which a pressure plate is opened at a first predetermined angle and the relative position of a capturing unit is adjusted at a first predetermined position in the second shape measurement processes, according to an embodiment of the present disclosure.

FIG. 7A is a schematic diagram illustrating a state in which the pressure plate 202 is opened at a first predetermined angle and the relative position of the capturing unit 220 is adjusted at a first predetermined position, according to the present embodiment.

Figure 7B:
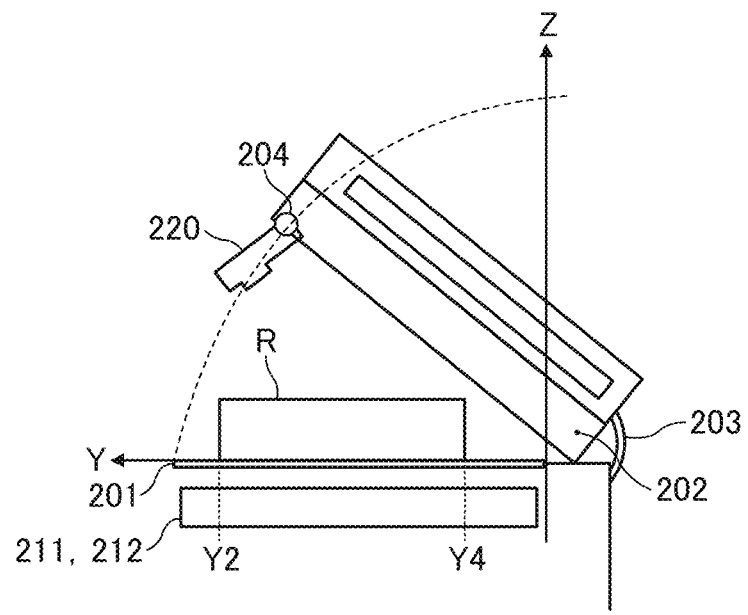
FIG. 7B is a schematic diagram illustrating a state in which a pressure plate is opened at a second predetermined angle and the relative position of a capturing unit is adjusted at a second predetermined position in the second shape measurement processes, according to an embodiment of the present disclosure.

FIG. 7B is a schematic diagram illustrating a state in which the pressure plate 202 is opened at a second predetermined angle and the relative position of the capturing unit 220 is adjusted at a second predetermined position, according to the present embodiment.

In the second shape measurement processes, the capturing unit 220 performs an imaging operation with a plurality of different opened angles of the pressure plate 202, and the disparity image data is generated from a plurality of items of image data that are obtained in each imaging operation. Accordingly, the heights Z1, Z2, Z3, and Z4 of the three-dimensional object R are calculated.

The flow of the second shape measurement processes to measure the heights Z1, Z2, Z3, and Z4 of the three-dimensional object R is described below. Firstly, the pressure plate 202 is opened up to the first prescribed angle, and the three-dimensional object R that is an to-be-scanned object is set on the contact glass 201. Then, the operation panel 2 is operated or manipulated to input, for example, shape measurement conditions to start the shape measurement. Accordingly, the controller 500 according to the present embodiment acquires the image data of the three-dimensional object R on the contact glass 201 using both the scanner unit 210 and the capturing unit 220.

In the second shape measurement processes, firstly, the scanner unit 210 performs an acquisition operation. In other words, the scanner unit 210 uses the first carrier 211 and the second carrier 212 to perform scanning to acquire the image data of the three-dimensional object R on the contact glass 201. According to such a configuration, the length or position in the X-direction or the length or position in the Y-direction of the three-dimensional object R on the contact glass 201 can be obtained with a high degree of accuracy.

Subsequently, in the second shape measurement processes, the capturing unit 220 performs the acquisition operation (imaging operation). More specifically, as illustrated in FIG. 7A, an image of the entire area of the contact glass 201 is captured by the capturing unit 220 in a state that the pressure plate 202 is opened up to the first prescribed angle and the relative position of the capturing unit 220 is adjusted at the first predetermined position. Accordingly, the controller 500 can acquire the image data of the three-dimensional object R captured from the first predetermined position.

Subsequently, the pressure plate 202 is moved so that the pressure plate 202 opens at a second predetermined angle, and the relative position of the capturing unit 220 is adjusted at a second predetermined position as illustrated in FIG. 7B. Then, an image of the entire area of the contact glass 201 is captured by the capturing unit 220. Accordingly, the controller 500 can acquire the image data of the three-dimensional object R captured from the second predetermined position.

Once the two items of image data is successfully obtained based on the first predetermined position and the second predetermined position as described above, the controller 500 performs disparity image generating processes to generate disparity image data (distance image data). In the disparity image generating processes, firstly, one of the two items of image data is set as reference image data, and the other one of the two items of image data is set as comparison image data. Secondly, a disparity between the reference image data and the comparison image data is computed to generate disparity image data. The disparity image data indicates a disparity image where the pixel values that correspond to the disparity values or distance values calculated for portions of the reference image in the reference image data are represented as the pixel values of the respective portions of the image.

More specifically, the controller 500 defines a block that is composed of a plurality of pixels (for example, sixteen pixels x pixel) around a single pixel of interest in a certain row of the reference image data. In parallel with that, in the same row in the comparison image data, a block of the same size as the block defined in the reference image data is shifted in a lateral-line direction on a pixel-by-pixel basis, and a correlation value that indicates the correlation between the characteristics of the pixel values of the block defined in the reference image data and the characteristics of the pixel values of each block of the comparison image data is each calculated. Then, based on the calculated correlation values, matching processes are performed to select one of the multiple blocks in the comparison image data that has the highest correlation with the block of the reference image data. Subsequently, the amounts of misalignment between the pixel of interest in the block of the reference image data and the corresponding pixels in the block of the comparison image data selected in the matching processes are calculated and obtained as disparity values. Such processes of calculating the disparity values are performed for the entirety of the reference image data or a single specific area of the reference image data to obtain the disparity image data.

As the characteristics of the block that are used for the matching processes, for example, the pixel values (values of brightness) of the multiple pixels in the block may be used. As a correlation value, for example, a sum total of the absolute values of the differences between the pixel values (values of brightness) of the pixels in the block of the reference image data and the pixel values (values of brightness) of the pixels in the block of the comparison image data that correspond to those in the block of the reference image data, respectively, may be used. In such a configuration, the block where the sum total becomes the smallest is considered to have the highest correlation.

In order to implement the matching processes by the controller 500 by processes at hardware, a method such as sum of squared difference (SSD), zero-mean sum of squared differences (ZSSD), sum of absolute difference (SAD), and zero-mean sum of absolute differences (ZSAD) may be used.

The controller 500 calculates the heights Z1, Z2, Z3, and Z4 based on the disparity values of the pixels corresponding to the points of the heights Z1, Z2, Z3, and Z4 of the three-dimensional object R and the disparity image data generated as described above. Subsequently, the controller 500 controls, for example, the image forming device 100 to output the result of the shape measurement processes to the sheet P, or to store the result of the shape measurement processes in a storage device inside the image forming apparatus 1. Alternatively, the controller 500 controls, for example, the image forming device 100 to send the result of the shape measurement processes to an external device through an output interface.

The two items of image data that are obtained by the capturing unit 220 based on the first predetermined position and the second predetermined position, respectively, in the present embodiment have relatively low dimensional accuracy and positional accuracy. Accordingly, in the second shape measurement processes, as described above, the two items of image data of the three-dimensional object R, which is the same to-be-scanned object as the above image data, are acquired by the scanner unit 210. The image data that is acquired by the scanner unit 210 has high dimensional accuracy and high positional accuracy in regard to the length or position in the X-direction or the length or position in the Y-direction of the three-dimensional object R. In order to handle such a situation, in the second shape measurement processes, the two pieces of image data that are obtained by the capturing unit 220 are corrected based on the length or position of the three-dimensional object in the X-direction or the length or position of the three-dimensional object R in the Y-direction, which are obtained from the image data obtained by the scanner unit 210. Accordingly, high-accuracy image data in which the dimensional accuracy and the positional accuracy are corrected can be obtained as the reference image data and the comparison image data in the disparity image generating processes.

Then, disparity image generating processes are performed based on the reference image data and comparison image data with high dimensional accuracy and high positional accuracy, which are obtained in the above correction. By so doing, disparity image data having a disparity value (distance value) with high accuracy can be generated. As a result, the heights Z1, Z2, Z3, and Z4 of the three-dimensional object R that are calculated from the disparity image data can also be measured with high accuracy.

In the second shape measurement processes, the disparity image data that is generated by capturing images of the three-dimensional object R from two upper points consisting of the first predetermined position and the second predetermined position is used. Accordingly, not only the heights Z1, Z2, Z3, and Z4 of the three-dimensional object R, i.e., the rectangular parallelepiped as illustrated in FIG. 4C, can be measured, but also the three-dimensional shape of a three-dimensional object that has a more complicated shape can be measured. For example, the three-dimensional shape of a three-dimensional object that has an uneven or rough top surface can be measured. For example, the three-dimensional shape of a circuit board on which a plurality of circuit components are mounted, as illustrated in FIG. 8A as will be described later, can be measured.

Third shape measurement processes are described below in which the shape of a three-dimensional object is measured based on the image data acquired by the image reading device 200. Overlapping descriptions with the description of the above embodiments as described above are omitted where appropriate.

Figure 8A:
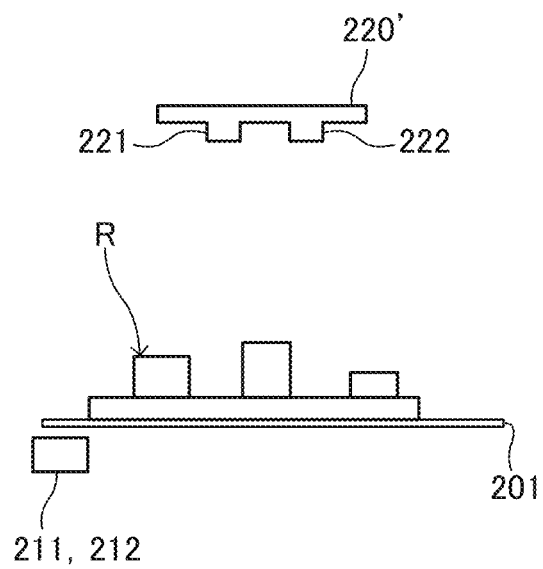
FIG. 8A is a schematic view of a capturing unit that is used in the third shape measurement processes to measure the shape of a three-dimensional object, when viewed from the front side of an image forming apparatus, according to an embodiment of the present disclosure.

FIG. 8A is a schematic view of a capturing unit 220' that is used in the third shape measurement processes to measure the shape of the three-dimensional object R, when viewed from the front side of the image forming apparatus 1, according to the present embodiment.

Figure 8B:
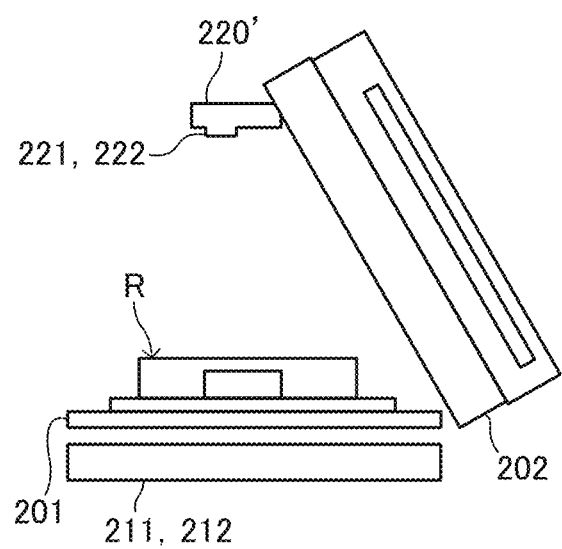
FIG. 8B is a schematic view of a capturing unit that is used in the third shape measurement processes to measure the shape of a three-dimensional object, when viewed from a side of an image forming apparatus, according to an embodiment of the present disclosure.

FIG. 8B is a schematic view of a capturing unit 220' that is used in the third shape measurement processes to measure the shape of the three-dimensional object R, when viewed from a side of the image forming apparatus 1, according to the present embodiment.

In the third shape measurement processes, a stereo camera that is provided with a plurality of imaging devices 221 and 222 is used as the capturing unit 220' attached to the pressure plate 202, and disparity image data is generated from a plurality of items of image data captured by the multiple imaging devices 221 and 222. By so doing, the shape of the three-dimensional object R is measured.

The flow of the third shape measurement processes to measure the shape of the three-dimensional object R is described below. Firstly, the pressure plate 202 is opened up to a prescribed angle, and the three-dimensional object R that is an to-be-scanned object is set on the contact glass 201. Then, the operation panel 2 is operated or manipulated to input, for example, shape measurement conditions to start the shape measurement. Accordingly, the controller 500 according to the present embodiment acquires the image data of the three-dimensional object R on the contact glass 201 using both the scanner unit 210 and the capturing unit 220.

In the third shape measurement process, in a similar manner to the second shape measurement process described above, firstly, an acquisition operation is performed by the scanner unit 210 to acquire the image data of the three-dimensional object R, and the length or position of the three-dimensional object R in the X-direction and the length or position of the three-dimensional object X in the Y-direction are obtained with high accuracy. Subsequently, in the third shape measurement processes, the capturing unit 220' performs the acquisition operation (imaging operation). More specifically, as illustrated in FIG. 8B, an image of the entire area of the contact glass 201 is captured by the multiple imaging devices 221 and 222 of the capturing unit 220 in a state that the pressure plate 202 is opened up to a prescribed angle and the relative position of the capturing unit 220 is adjusted at a predetermined position. Accordingly, the controller 500 can acquire two pieces of image data captured by the multiple imaging devices 221 and 222 that are disposed at different positions.

Once two items of image data are obtained by the capturing unit 220', in a similar manner to the second shape measurement processes as described above, the controller 500 according to the present embodiment performs disparity image generating processes to generate disparity image data (distance image data). Then, the controller 500 controls, for example, the image forming device 100 to output the result of the third shape measurement processes such as the generated disparity image data and the height of the three-dimensional object R calculated from the disparity image data to the sheet P, or to store the result of the third shape measurement processes in a storage device inside the image forming apparatus 1. Alternatively, the controller 500 controls, for example, the image forming device 100 to send the result of the third shape measurement processes to an external device through an output interface.

In the third shape measurement processes, the two items of image data that are obtained by the capturing unit 220' have relatively low dimensional accuracy and positional accuracy. Accordingly, also in the third shape measurement processes, in a similar manner to the second shape measurement processes as described above, the two items of image data that are obtained by the capturing unit 220' are corrected based on the length or position of the three-dimensional object in the X-direction or the length or position of the three-dimensional object R in the Y-direction, which are obtained from the image data obtained by the scanner unit 210. Accordingly, high-accuracy image data in which the dimensional accuracy and the positional accuracy are corrected can be obtained as the reference image data and the comparison image data in the disparity image generating processes. Disparity image generating processes are performed based on the reference image data and comparison image data with high dimensional accuracy and high positional accuracy, which are obtained in the above correction. By so doing, disparity image data having a disparity value (distance value) with high accuracy can be generated.

Second Embodiment

An image reading device according to a second embodiment of the present disclosure, which serves as an image scanner and is provided for an image forming apparatus provided with an electrophotographic image recording unit, is described below. Overlapping descriptions with the description of the first embodiment as described above are omitted where appropriate.

Figure 9:
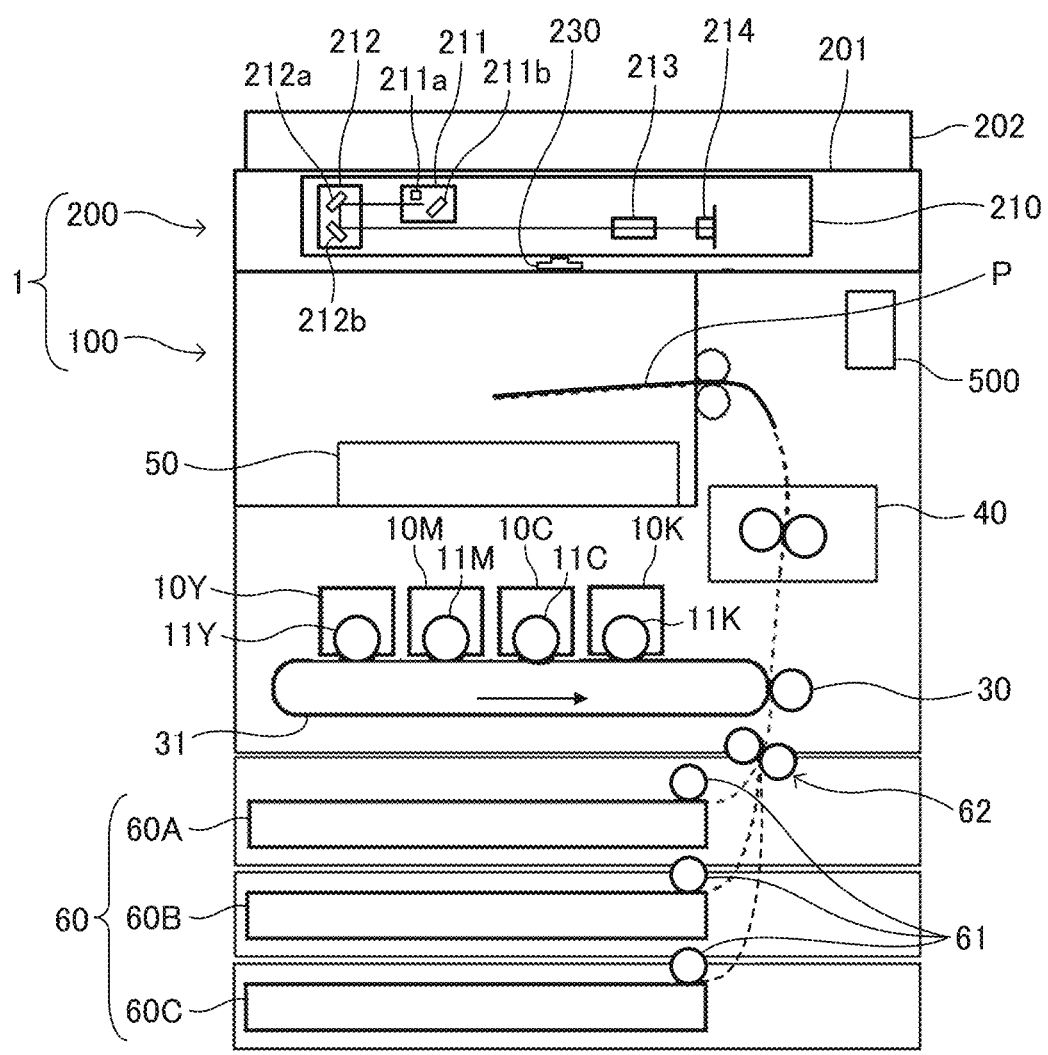
FIG. 9 is a schematic diagram illustrating a configuration of an image forming apparatus according to a second embodiment of the present disclosure.

FIG. 9 is a schematic diagram illustrating a configuration of the image forming apparatus 1 according to the second embodiment of the present disclosure.

Figure 10:
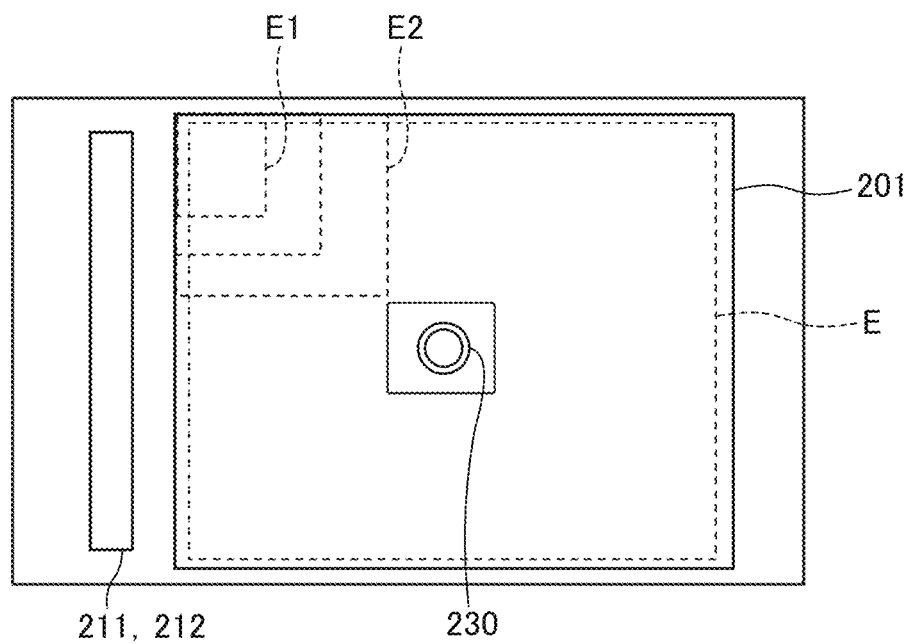
FIG. 10 is a schematic top view of an image reading device when a pressure plate of the image forming apparatus of FIG. 9 is opened, according to the second embodiment of the present disclosure.

FIG. 10 is a schematic top view of the image reading device 200 when the pressure plate 202 is opened, according to the second embodiment of the present disclosure.

In the first embodiment of the present disclosure as described above, the capturing unit 220 or the capturing unit 220' is disposed above the contact glass 201, which is on the other side of the contact glass 201 with reference to the scanner unit 210, to captures an image of the to-be-scanned object on the contact glass 201. By contrast, in the second embodiment of the present disclosure, the capturing unit 230 is disposed under the contact glass 201, which is on the same side of the contact glass 201 as the scanner unit 210, to captures an image of the to-be-scanned object on the contact glass 201.

The capturing unit 230 according to the second embodiment of the present disclosure has a configuration or structure similar to that of the above capturing unit 220 according to the first embodiment of the present disclosure. However, as illustrated in FIG. 9, the capturing unit 230 according to the second embodiment of the present disclosure is disposed below the contact glass 201, and is disposed even lower than the scanner unit 210. The capturing unit 230 is configured to capture an image of the entire area of the contact glass 201.

In the second embodiment, when the image data of the document G is to be acquired by the scanner unit 210, the controller 500 causes the capturing unit 230 to perform the acquisition operation (imaging operation) in advance. More specifically, the controller 500 controls the image reading device 200, and uses the capturing unit 230 to capture an image of the document G on the contact glass 201 from below. Due to such a configuration, the image data of an entire area E of the contact glass 201 including the document G is acquired, and the acquired image data is sent to the controller 500. The controller 500 obtains the size of the document G on the contact glass 201 based on the image data of the entire area E.

Subsequently, the controller 500 determines the scanning range based on the document size acquired and causes the first carrier 211 and the second carrier 212 to move according to the determined scanning range, and causes the scanner unit 210 to scan the document G from below. As a result, the image data of the document G is acquired by the scanner unit 210 with a high degree of accuracy.

According to the second embodiment of the present disclosure, image acquisition operation or imaging operation can be performed at high speed by the capturing unit 230. Due to such an advantage, the size of the document G on the contact glass 201 can be measured and obtained in a very short time before the acquisition operation of the scanner unit 210 starts. Accordingly, as the scanning range can be appropriately limited to the minimum necessary range, it is possible to shorten the light emission time of the light source 211a on the first carrier 211 and shorten the acquisition operation time by the scanner unit 210.

In particular, when the document G has an indefinite size E1, an annoying operation such as an input operation of specifying the document size on the operation panel 2 can be omitted, and the customer convenience improves. In other words, as illustrated in FIG. 10, when the document G has a standardized size E2, as known in the art, the input operation to specify the document size is completed only by pressing a selection key prepared in advance on the operation panel 2. However, when the document G has an indefinite size E1, as known in the art, the document size is specified by an annoying input operation such as inputting the vertical and horizontal numerical values of the document size. By contrast, in the second embodiment of the present disclosure, the document size is obtained from the image data acquired by the capturing unit 230. Accordingly, such an annoying input operation can be omitted. Moreover, the length of time it takes to obtain the document size from the image data acquired by the capturing unit 230 is so short that the user does not have to wait.

The fourth shape measurement processes are described below in which the shape of a three-dimensional object R is measured based on the image data acquired by the image reading device 200 according to the second embodiment of the present disclosure. Overlapping descriptions with the description of the above embodiments as described above are omitted where appropriate.

Figure 11A:
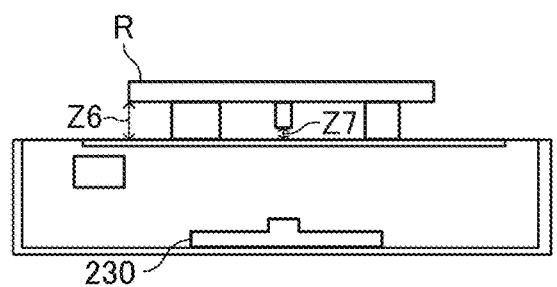
FIG. 11A is a schematic view of a capturing unit that is used in the fourth shape measurement processes to measure the shape of a three-dimensional object, when viewed from the front side of the image forming apparatus of FIG. 9, according to the second embodiment of the present disclosure.

FIG. 11A is a schematic view of the capturing unit 230 that is used in the fourth shape measurement processes to measure the shape of the three-dimensional object R, when viewed from the front side of the image forming apparatus 1 of FIG. 9, according to the second embodiment of the present disclosure.

Figure 11B:
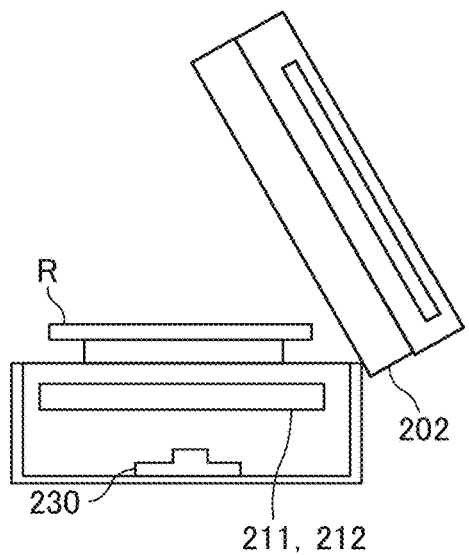
FIG. 11B is a schematic view of a capturing unit that is used in the fourth shape measurement processes to measure the shape of a three-dimensional object, when viewed from a side of the image forming apparatus of FIG. 9, according to the second embodiment of the present disclosure.

FIG. 11B is a schematic view of the capturing unit 230 that is used in the fourth shape measurement processes to measure the shape of the three-dimensional object R, when viewed from a side of the image forming apparatus 1 of FIG. 9, according to the second embodiment of the present disclosure.

Figure 11C:
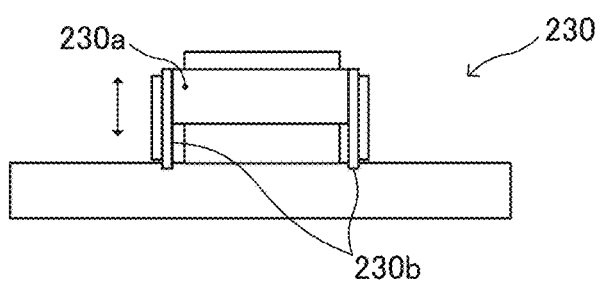
FIG. 11C is a schematic diagram of an autofocus mechanism according to an embodiment of the present disclosure.

FIG. 11C is a schematic diagram of an autofocus mechanism according to the present embodiment.

Figure 11D:
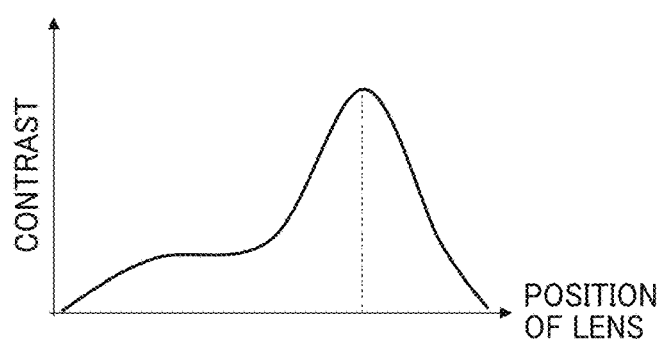
FIG. 11D is a graph illustrating the relation between the contrast and the position of a lens, which is achieved by an autofocus mechanism, according to an embodiment of the present disclosure.

FIG. 11D is a graph illustrating the relation between the contrast and the position of a lens, which is achieved by an autofocus mechanism, according to the present embodiment.

In the fourth shape measurement processes, the shape of the three-dimensional object R as viewed from below is measured based on the image data obtained by imaging by the capturing unit 230 disposed below the contact glass 201.

The flow of the fourth shape measurement processes to measure the shape of the three-dimensional object R is described below. Firstly, the pressure plate 202 is opened, and the three-dimensional object R that is an to-be-scanned object is set on the contact glass 201. Then, the operation panel 2 is operated or manipulated to input, for example, shape measurement conditions to start the shape measurement. Accordingly, the controller 500 according to the present embodiment acquires the image data of the three-dimensional object R on the contact glass 201 using both the scanner unit 210 and the capturing unit 230.

In the fourth shape measurement process, firstly, an acquisition operation is performed by the scanner unit 210 to acquire the image data of the three-dimensional object R, and the length or position of the three-dimensional object R in the X-direction and the length or position of the three-dimensional object X in the Y-direction are obtained with high accuracy. Subsequently, in the fourth shape measurement processes, the capturing unit 230' performs the acquisition operation (imaging operation). More specifically, the capturing unit 230' capture an image of the entire area of the contact glass 201 from below the contact glass 201.

In so doing, the controller 500 according to the present embodiment controls the autofocus function of the capturing unit 230 to adjust the focus to a plurality of points with different heights, and obtains the parameter values of the autofocus function at each time from the capturing unit 230.

For example, when an imaging lens 230a in the autofocus mechanism as illustrated in FIG. 11C is moved by an actuator 230b in an optical-axis direction indicated by an arrow, as illustrated in FIG. 11D by way of example, the contrast of the captured image changes depending on the position of the lens. There are a plurality of points with different heights on the three-dimensional object R to be measured, and the position of the lens in focus with the highest contrast is obtained as a parameter value for each one of the multiple points. Accordingly, the distance from the obtained position of the lens to each one of the multiple points on the three-dimensional object R to be measured can be measured and obtained as the height of each one of the multiple points. In particular, the parameter values of the autofocus function may be, for example, a value output from an autofocus (AF) sensor in the phase-contrast method, the coordinates of the focal point on a focused image, and the focal length.

In the fourth shape measurement processes, the height of the three-dimensional object R at that portion is calculated based on the parameter value of the autofocus function as obtained above. For example, as illustrated in FIG. 11A, when the three-dimensional object R is a circuit board on which a plurality of circuit components are mounted, the distance (height) Z6 between the top surface of the contact glass 201 and the surface of the circuit board is calculated based on the parameter value of the autofocus function when the surface of the circuit board is focused. Moreover, the distance (height) Z7 between the top surface of the contact glass 201 and the circuit components is calculated based on the parameter value of the autofocus function when the circuit components on the surface of the circuit board is focused.

In the present embodiment, the two items of image data that are obtained by the capturing unit 230 have relatively low dimensional accuracy and positional accuracy. Accordingly, in the fourth shape measurement processes, as described above, the image data of the three-dimensional object R, which is the same to-be-scanned object as the above image data, is acquired by the scanner unit 210. The image data that is acquired by the scanner unit 210 has high dimensional accuracy and high positional accuracy in regard to the length or position in the X-direction or the length or position in the Y-direction of the three-dimensional object R. Accordingly, in the fourth shape measurement processes, the image data that is obtained by the capturing unit 230 and is used for the autofocus function is corrected based on the length or position of the three-dimensional object in the X-direction or the length or position of the three-dimensional object R in the Y-direction, which are obtained from the image data obtained by the scanner unit 210. As a result, focusing can be performed with higher accuracy, and a parameter value for the autofocus function can be obtained with a high degree of accuracy. Accordingly, the shape or dimensions of the three-dimensional object R can be measured with higher accuracy.

Fifth shape measurement processes are described below in which the shape of a three-dimensional object is measured based on the image data acquired by the image reading device 200 according to the second embodiment of the present disclosure. Overlapping descriptions with the description of the above embodiments as described above are omitted where appropriate.

Figure 12A:
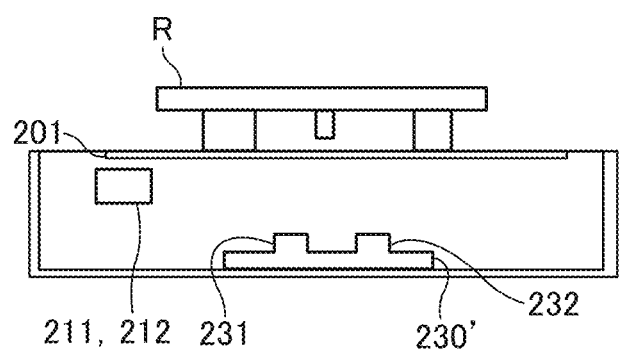
FIG. 12A is a schematic view of a capturing unit that is used in the fifth shape measurement processes to measure the shape of a three-dimensional object, when viewed from the front side of the image forming apparatus of FIG. 9.

FIG. 12A is a schematic view of a capturing unit 230' that is used in the fifth shape measurement processes to measure the shape of the three-dimensional object R, when viewed from the front side of the image forming apparatus 1, according to the present embodiment.

Figure 12B:
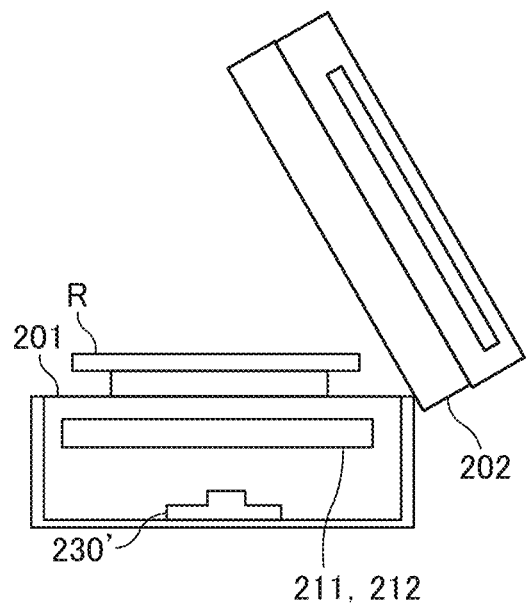
FIG. 12B is a schematic view of a capturing unit that is used in the fifth shape measurement processes to measure the shape of a three-dimensional object, when viewed from a side of the image forming apparatus of FIG. 9.

FIG. 12B is a schematic view of a capturing unit 230' that is used in the fifth shape measurement processes to measure the shape of the three-dimensional object R, when viewed from a side of the image forming apparatus 1, according to the present embodiment.

In the fifth shape measurement processes, a stereo camera that is provided with a plurality of imaging devices 231 and 232 is used as the capturing unit 230' arranged below the contact glass 201, and disparity image data is generated from a plurality of items of image data captured by the multiple imaging devices 231 and 232. By so doing, the shape of the three-dimensional object R is measured.

The flow of the fifth shape measurement processes to measure the shape of the three-dimensional object R is described below. Firstly, the pressure plate 202 is opened, and the three-dimensional object R that is an to-be-scanned object is set on the contact glass 201. Then, the operation panel 2 is operated or manipulated to input, for example, shape measurement conditions to start the shape measurement. Accordingly, the controller 500 according to the present embodiment acquires the image data of the three-dimensional object R on the contact glass 201 using both the scanner unit 210 and the capturing unit 230'.

In the fifth shape measurement processes, in a similar manner to the fourth shape measurement processes described above, firstly, an acquisition operation is performed by the scanner unit 210 to acquire the image data of the three-dimensional object R, and the length or position of the three-dimensional object R in the X-direction and the length or position of the three-dimensional object X in the Y-direction are obtained with high accuracy. Subsequently, in the fifth shape measurement processes, the capturing unit 230' performs the acquisition operation (imaging operation). More specifically, the multiple imaging devices 231 and 232 of the capturing unit 230' capture an image of the entire area of the contact glass 201. Accordingly, the controller 500 can acquire two items of image data captured by the multiple imaging devices 231 and 232 that are disposed at different positions.

Once two items of image data are obtained by the capturing unit 220', in a similar manner to third shape measurement processes as described above, the controller 500 according to the present embodiment performs disparity image generating processes to generate disparity image data (distance image data). Then, the controller 500 controls, for example, the image forming device 100 to output the result of the fifth shape measurement processes such as the generated disparity image data and the height of the three-dimensional object R calculated from the disparity image data to the sheet P, or to store the result of the fifth shape measurement processes in a storage device inside the image forming apparatus 1. Alternatively, the controller 500 controls, for example, the image forming device 100 to send the result of the fifth shape measurement processes to an external device through an output interface.

In the fifth shape measurement processes, the two items of image data that are obtained by the capturing unit 230' have relatively low dimensional accuracy and positional accuracy. Accordingly, in the fifth shape measurement processes, the two items of image data that are obtained by the capturing unit 230' are corrected based on the length or position of the three-dimensional object in the X-direction or the length or position of the three-dimensional object R in the Y-direction, which are obtained from the image data obtained by the scanner unit 210. Accordingly, high-accuracy image data in which the dimensional accuracy and the positional accuracy are corrected can be obtained as the reference image data and the comparison image data in the disparity image generating processes. Disparity image generating processes are performed based on the reference image data and comparison image data with high dimensional accuracy and high positional accuracy, which are obtained in the above correction. By so doing, disparity image data having a disparity value (distance value) with high accuracy can be generated. As a result, the shape such as the heights of the three-dimensional object R that are calculated from the disparity image data when the three-dimensional object R is viewed from below can be measured with high accuracy.

Figure 13A:
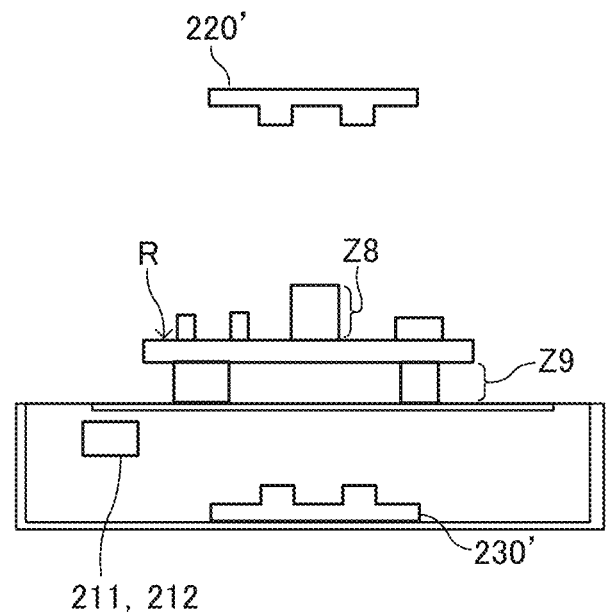
FIG. 13A is a schematic view of a configuration in which a capturing unit is attached to a pressure plate and another capturing unit is arranged below a contact glass, as viewed from the front side of the image forming apparatus of FIG. 9.
Figure 13B:
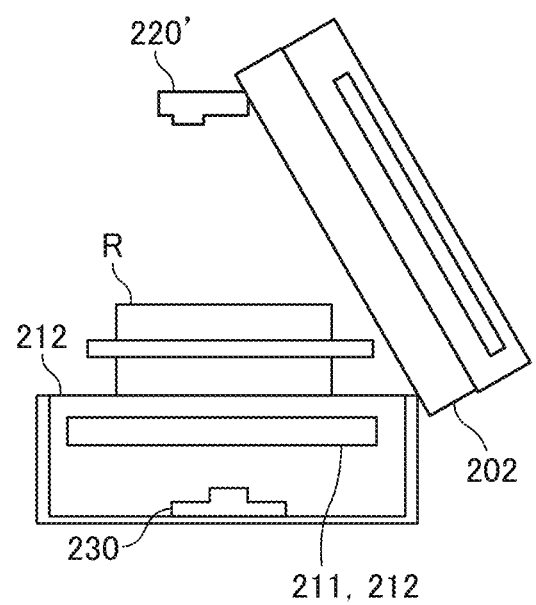
FIG. 13B is another schematic view of the configuration of FIG. 13A, as viewed from a side of the image forming apparatus of FIG. 9.

In the first embodiment or the second embodiment of the present disclosure described above, one capturing unit is disposed above or below the contact glass 201. However, no limitation is indicated thereby, and a pair of capturing units may be disposed both above and below the contact glass 201, respectively. For example, as illustrated in FIG. 13A and FIG. 13B, the capturing unit 220' that is used in the third shape measurement processes may be attached to the pressure plate 202, and the capturing unit 230' that is used in the fifth shape measurement processes may be disposed below the contact glass 201. Due to such a configuration, the image data that is acquired by the scanner unit 210 and two types of image data that are captured from above and below the contact glass 201, respectively, can be obtained as the image data of the same to-be-scanned object, and the image data with a large amount of information can be obtained through a series of acquisition operations. Note that the series of acquisition operations referred to herein are at least a series of operations performed without moving the to-be-scanned object placed on the mounting table.

The embodiments described above are given as an example, and unique advantageous effects are achieved for each of the following modes given below.

First Mode

According to the first mode of the present disclosure, an image reading device such as the image reading device 200 includes a scanned-image acquisition unit such as the scanner unit 210 configured to scan a mounting table such as a top face of a mounting table such as the contact glass 201 to obtain image data of a to-be-scanned object such as the three-dimensional object R placed on the mounting table, a capturing unit such as the capturing units 220, 220', 230, and 230' configured to capture an image of the to-be-scanned object to obtain the image data of the to-be-scanned object, and a shape measuring device such as the controller 500 configured to measure a shape of a same three-dimensional to-be-scanned placed on the mounting table based on the image data of the same to-be-scanned object obtained by the scanned-image acquisition unit and the image data of the same to-be-scanned object obtained by the capturing unit.

In a pair of items of image data obtained by scanning images of the same reading object by the scanned-image acquisition unit and the capturing unit, respectively, for example, the details of the obtained image data and the acquisition time of the image data are different from each other due to the differences in obtaining method. As known in the art, the scanned-image acquisition unit can acquire the image data with high dimensional accuracy and high positional accuracy in the directions of the plane of the mounting table. However, it is difficult for the scanned-image acquisition unit to acquire image data with three-dimensionality including the depth dimension of the to-be-scanned object. As the scanned-image acquisition unit requires a certain length of time to perform scanning, the acquisition time of image data is relatively long. By contrast, the capturing unit requires only a short length of time to perform scanning, and thus the acquisition time of the image data is short. However, the dimensional accuracy or positional accuracy of the acquired image data is low. It is easy for the capturing unit to acquire image data with three-dimensionality including the depth dimension of the to-be-scanned object.

As described above, there are difference between the scanned-image acquisition unit and the capturing unit in, for example, the details of the acquired image data and the acquisition time. For this reason, when the shape of the to-be-scanned object is to be measured with high accuracy, it is desired that the image data of the same to-be-scanned object be read and obtained by both the capturing unit and the scanned-image acquisition unit.

A known image reading device that is provided with a scanned-image acquisition unit and an capturing unit can acquire the image data by scanning the to-be-scanned object with the scanned-image acquisition unit, and can acquire the image data by performing the imaging with the capturing unit. However, in the known image reading device, the capturing unit is configured to capture an image of the to-be-scanned object placed on the top surface of the pressing member that is closed so as to cover the mounting table, and is not configured to capture an image of the to-be-scanned object placed on the mounting table. On the other hand, the scanned-image acquisition unit is configured to scan the to-be-scanned object placed on the mounting table, and is not configured to scan the to-be-scanned object placed on the top surface of the pressing member that is closed so as to cover the mounting table. For this reason, in the known image reading device, when the image data of the same to-be-scanned object is to be read and obtained by both the capturing unit and the scanned-image acquisition unit, the to-be-scanned object needs to be moved, which could be annoying for a user.

By contrast, in the image reading device according to the present mode of the present disclosure, in a similar manner to the scanned-image acquisition unit, the capturing unit is configured to obtain image data of a to-be-scanned object placed on the mounting table. Due to such a configuration according to the present mode of the present disclosure, while the to-be-scanned object is kept placed on the mounting table, the image data of the to-be-scanned object can be acquired by both the capturing unit and the scanned-image acquisition unit. Accordingly, the shape of the to-be-scanned object can be measured with high accuracy, without moving the to-be-scanned object, which could be annoying for a user.

Second Mode

According to the second mode of the present disclosure, in the image reading device according to the first mode of the present disclosure, the scanned-image acquisition unit such as the scanner unit 210 includes a scanned-image acquisition unit configured to obtain the image data of the same to-be-scanned object from a front side or rear side of the mounting table, and the capturing unit includes an capturing unit such as the capturing units 220 and 220' configured to obtain the image data of the same to-be-scanned object from the rear side of the mounting table when the scanned-image acquisition unit obtains the image data from the front side of the mounting table and configured to obtain the image data of the same to-be-scanned object from the front side of the mounting table when the scanned-image acquisition unit obtains the image data from the rear side of the mounting table.

According to the present mode, the scanned-image acquisition unit and the capturing unit can acquire different image data from two sides of the same to-be-scanned object. Due to such a configuration, the image data of a portion of the same to-be-scanned object that cannot be obtained by the scanned-image acquisition unit can be obtained by the capturing unit, and the image data of another portion of the same to-be-scanned object that cannot be obtained by the capturing unit can be obtained by the scanned-image acquisition unit. Accordingly, the image data with a large amount of information can be obtained, without moving the to-be-scanned object, which could be annoying for a user.

Third Mode

According to the third mode of the present disclosure, in the image reading device according to the first or second mode of the present disclosure, the capturing unit comprises a plurality of imaging devices 221, 222, 231, and 232 configured to capture an image of the same to-be-scanned object from a same side of the mounting table to obtain the image data of the same to-be-scanned object.

According to the present mode, the disparity image data can be generated from the image data that is captured by each one of the multiple imaging devices. As a result, the shape measurement processes can be performed based on the disparity image data.

Fourth Mode

According to the fourth mode of the present disclosure, the image reading device according to any one of the first mode to the third mode of the present disclosure further comprises a pressing member such as the pressure plate 202 openable and closable with respect to the mounting table to press the to-be-scanned object placed on the mounting table against the mounting table, and the capturing unit is attached to the pressing member.

According to the present mode, a member dedicated to installing the capturing unit can be omitted as the capturing unit is attached to the pressing member arranged for the sake of the scanned-image acquisition unit, and a relatively simple configuration can be achieved.

Fifth Mode

According to the fifth mode of the present disclosure, in the image reading device according to the fourth mode of the present disclosure, the capturing unit is configured to capture an image of the same to-be-scanned object with a plurality of different opened angles of the pressing member.

According to the present mode, the image data of the same to-be-scanned object captured at different angles can be obtained using the same capturing unit. Accordingly, the image data with a large amount of information can be obtained, without moving the to-be-scanned object, which could be annoying for a user. According to the present mode, disparity image data can be generated from a plurality of items of image data captured from directions that are different from each other. Due to such a configuration, the use of a stereo camera is not necessary, and the shape measurement processes can be performed based on the disparity image data.

Sixth Mode

According to the sixth mode of the present disclosure, in the image reading device according to any one of the first to fifth mode of the present disclosure, after the capturing unit captures an image of the same to-be-scanned object, the image data of the same to-be-scanned object is obtained by the scanned-image acquisition unit based on the image data obtained by the capturing unit.

According to the present mode, the operation of the scanned-image acquisition unit for the same to-be-scanned object can be changed based on the image data obtained by the capturing unit. For example, if the size of the to-be-scanned object is figured out based on the image data obtained by the capturing unit, the scanning range of the scanned-image acquisition unit can be changed according to the size of the to-be-scanned object, and the length of time during which the scanned-image acquisition unit operates can be shortened. What is more, the capturing unit can acquire the image data of the to-be-scanned object at higher speed than the acquisition operation of the scanned-image acquisition unit. Accordingly, even if the operation of the scanned-image acquisition unit is started after the operation of the capturing unit, the delay in the operation of the scanned-image acquisition unit is not sensed by a user.

Seventh Mode

According to the seventh mode of the present disclosure, in the image reading device according to any one of the first to sixth mode of the present disclosure, the shape measurement process includes a dimension measuring process to measure a dimension of a prescribed point of the same to-be-scanned object such as the heights Z1, Z2, Z3, and Z4 of the to-be-scanned object, and the shape measuring device is configured to perform the dimension measuring process upon obtaining image data of a sheet on which an image of the prescribed point is displayed by the scanned-image acquisition unit or the capturing unit to specify the prescribed point of the same to-be-scanned object.

According to the present mode, the manipulation to specify a portion whose dimensions are to be measured can be omitted, and the customer convenience improves.

Eighth Mode

According to the eighth mode of the present disclosure, in the image reading device according to any one of the first to seventh mode of the present disclosure, the capturing unit has an autofocus function, and the shape measurement process includes a dimension measuring process to measure a dimension of a prescribed point of the same to-be-scanned object based on a parameter value obtained by the autofocus function.

According to the present mode, the height of the to-be-scanned object placed on the mounting table can easily be measured by the autofocus function provided for the capturing unit.

Ninth Mode

According to the ninth mode of the present disclosure, the image forming apparatus 1 includes an image scanner such as the image reading unit 200 configured to obtain image data of a to-be-scanned object such as the three-dimensional object R placed on the mounting table such as a top face of a mounting table such as the contact glass 201, and an image recording unit such as the image forming device 100 configured to record an image on a recording material such as the sheet P. In the image forming apparatus according to the present modification, the image reading device according to any one of the first to eighth modes is used as the image scanner.

According to the present mode, an image forming apparatus can be provided where, when the image data of the same to-be-scanned object is to be read and obtained by both the capturing unit and the scanned-image acquisition unit to measure the shape of the to-be-scanned object, the shape of the to-be-scanned object can be measured without moving the to-be-scanned object, which could be annoying for a user.

Tenth Mode

According to the tenth mode of the present disclosure, in the image forming apparatus according to the ninth mode of the present disclosure, the image recording unit is configured to record a result of the shape measurement process in the image reading device on the recording material.

According to the present mode, a recording material on which the result of the shape measurement process performed on the to-be-scanned object is recorded can be given to a user instantly.

Note that numerous additional modifications and variations are possible in light of the above teachings. It is therefore to be understood that within the scope of the appended claims, the disclosure of the present disclosure may be practiced otherwise than as specifically described herein. For example, elements and/or features of different illustrative embodiments may be combined with each other and/or substituted for each other within the scope of this disclosure and appended claims.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

What is claimed is:

1. An image reading device comprising:
   a camera configured to capture first image data of a to-be-scanned object placed on a mounting table from a front side of the mounting table;
   a scanner configured to scan the mounting table, from a rear side of the mounting table according to a scanning range, to obtain second image data of the to-be-scanned object;
   and
   processing circuitry configured to
      determine the scanning range based on the first image data, and
      determine measurements of a shape of the to-be-scanned object based on the first image data and the second image data.

2. The image reading device according to claim 1, wherein the camera comprises a plurality of imaging devices configured to capture the first image data from a same side of the mounting table.

3. The image reading device according to claim 1, further comprising:
   a cover openable and closable with respect to the mounting table, the cover configured to press the to-be-scanned object against the mounting table,
   wherein the camera is attached to the cover.

4. The image reading device according to claim 3, wherein the camera is configured to capture the first image data via a plurality of different opened angles of the cover.

5. The image reading device according to claim 1, wherein the processing circuitry is further configured to determine the measurements of the shape by
   determining a prescribed point based on at least one of the first image data or the second image data, and
   determining a dimension of the prescribed point of the to-be-scanned object.

6. The image reading device according to claim 1, wherein the camera is configured to
   perform an autofocus function, and obtain a parameter value of the to-be-scanned object via the autofocus function, and wherein the processing circuitry is configured to measure a dimension of a prescribed point of the to-be-scanned object based on the parameter value.

7. An image forming apparatus comprising:

an image reading device including a camera configured to capture first image data of a to-be-scanned object placed on a mounting table from a front side of the mounting table, a scanner configured to scan the mounting table from a rear side of the mounting table, according to a scanning range, to obtain second image data of the to-be-scanned object, and processing circuitry configured to determine the scanning range based on the first image data, and determine measurements of a shape of the to-be-scanned object based on the first image data and the second image data; and a printer configured to record an image on a recording material.

8. The image forming apparatus according to claim 7, wherein the printer is configured to record the measurements of the shape on the recording material.

9. The image reading device according to claim 1, wherein the to-be-scanned object is a three dimensional object.

10. The image reading device according to claim 1, wherein the processing circuitry is further configured to adjust a capturing range based on the first image data, and wherein the camera is configured to capture an image of the to-be-scanned object according to the adjusted capturing range.

11. The image reading device according to claim 1, wherein the processing circuitry is configured to determine the measurements of the shape of the to-be-scanned object by:

determining a first left end of the to-be-scanned object and a first right end of the to-be-scanned object in a first direction based on the first image data and the second image data; and determining a second left end of the to-be-scanned object and a second right end of the to-be-scanned object in a second direction based on the first image data and the second image data.

12. The image reading device according to claim 1, wherein the processing circuitry is further configured to determine the measurements of the shape by determining a measurement of the shape in a third direction perpendicular to the mounting table.

13. The image reading device according to claim 11, wherein the processing circuitry is configured to determine a first height of the to-be-scanned object based on a position of an optical axis of a lens of the camera, the first left end.

14. The image reading device according to claim 13, wherein the processing circuitry is configured to determine a second height of the to-be-scanned object based on the position of the optical axis and the first right end.

15. The image forming apparatus according to claim 7, wherein the processing circuitry is further configured to adjust a capturing range based on the first image data, and the camera is configured to capture an image of the to-be-scanned object according to the adjusted capturing range.

16. The image forming apparatus according to claim 7, wherein the processing circuitry is configured to determine the measurements of the shape of the to-be-scanned object by:

determining a first left end of the to-be-scanned object and a first right end of the to-be-scanned object in a first direction based on the first image data and the second image data; and determining a second left end of the to-be-scanned object and a second right end of the to-be-scanned object in a second direction based on the first image data and the second image data.

17. The image forming apparatus according to claim 7, wherein the processing circuitry is further configured to determine the measurements of the shape by determining a measurement of the shape in a third direction perpendicular to the mounting table.

18. The image forming apparatus according to claim 16, wherein the processing circuitry is configured to determine a first height of the to-be-scanned object based on a position of an optical axis of a lens of the camera, the first left end.

19. The image forming apparatus according to claim 18, wherein the processing circuitry is configured to determine a second height of the to-be-scanned object based on the position of the optical axis and the first right end.

20. The image reading device according to claim 4, wherein the first image data comprises a plurality of image data corresponding with the plurality of different opened angles of the cover.

* * * * *